(12) United States Patent
Gordon et al.

(10) Patent No.: US 8,407,120 B1
(45) Date of Patent: *Mar. 26, 2013

(54) SYSTEM AND METHOD FOR PROVIDING AN ADJUSTED WEIGHTED REPEAT SALE INDEX

(75) Inventors: James Douglas Gordon, Arlington, VA (US); Pamela W. Simms, Cary, NC (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/344,761

(22) Filed: Dec. 29, 2008

(51) Int. Cl.
*G06Q 40/00* (2012.01)

(52) U.S. Cl. .................................................. 705/35

(58) Field of Classification Search .......... 705/1–318; 702/1–182; 706/1–52
See application file for complete search history.

(56) References Cited

U.S. PATENT DOCUMENTS

| | | | |
|---|---|---|---|
| 6,401,070 B1 * | 6/2002 | McManus et al. | 705/313 |
| 6,609,109 B1 | 8/2003 | Bradley et al. | |
| 6,842,738 B1 | 1/2005 | Bradley et al. | |
| 7,509,261 B1 * | 3/2009 | McManus et al. | 705/313 |

OTHER PUBLICATIONS

John et al., Depreciation of Housing Capital, Maintenance, and House Price Inflation: Estimates from a Repeat Sales Model, Jun. 30, 2006, University of Connecticut and Syracuse University, web, 2-41.*

* cited by examiner

*Primary Examiner* — Marissa Liu
(74) *Attorney, Agent, or Firm* — Finnegan, Henderson, Farabow, Garrett & Dunner, LLP

(57) ABSTRACT

Systems, methods, and computer-readable storage media are described for estimating real estate property values based on an adjusted repeat sales model. In one exemplary embodiment, a computer-implemented method comprises calculating data for estimating the adjustments from aggregated levels to disaggregated levels by marking a first transaction to a second transaction using a repeat sales house price index function at an aggregated level; determining, using the calculated data, an estimate of the deviation between the repeat sales house price index at the aggregated level and a repeat sales house price index at a disaggregated level; and calculating the repeat sales house price index at the disaggregated level based on the determined estimate of the deviation from the aggregated level.

15 Claims, 9 Drawing Sheets

| | | n | Median | +/- 10% | +/- 20% | Robust RMSE |
|---|---|---|---|---|---|---|
| 505 | Overall (2005Q4-2006Q4 | | 510 | 515 | 520 | 525 |
| | WRSI | 382,733 | 1.1 | 56.9 | 82.9 | 12.5 |
| | Adjusted WRSI | 382,733 | 0.3 | 57.5 | 83.3 | 12.3 |
| 530 | 2006Q4 | | | | | |
| | WRSI | 71,250 | 1.5 | 54.7 | 81.1 | 13.3 |
| | Adjusted WRSI | 71,250 | 0.0 | 55.4 | 81.8 | 12.9 |
| 540 | 2006Q3 | | | | | |
| | WRSI | 99,310 | 0.6 | 58.0 | 83.8 | 12.1 |
| | Adjusted WRSI | 99,310 | 0.3 | 58.3 | 83.9 | 12.1 |
| 550 | 2006Q2 | | | | | |
| | WRSI | 84,571 | 0.5 | 57.8 | 83.9 | 12.2 |
| | Adjusted WRSI | 84,571 | 0.3 | 58.2 | 84.0 | 12.1 |
| 560 | 2006Q1 | | | | | |
| | WRSI | 53,407 | 2.0 | 55.7 | 81.5 | 13.0 |
| | Adjusted WRSI | 53,407 | 0.4 | 56.9 | 82.5 | 12.5 |
| 570 | 2005Q4 | | | | | |
| | WRSI | 74,195 | 1.2 | 57.2 | 83.1 | 12.4 |
| | Adjusted WRSI | 74,195 | 0.5 | 57.7 | 83.5 | 12.3 |

| | | n | Median | +/-10% | +/-20% | Robust RMSE |
|---|---|---|---|---|---|---|
| 505 | Overall (2005Q4-2006Q4 | | 510 | 515 | 520 | 525 |
| | WRSI | 382,733 | 1.1 | 56.9 | 82.9 | 12.5 |
| | Adjusted WRSI | 382,733 | 0.3 | 57.5 | 83.3 | 12.3 |
| 530 | 2006Q4 | | | | | |
| | WRSI | 71,250 | 1.5 | 54.7 | 81.1 | 13.3 |
| | Adjusted WRSI | 71,250 | 0.0 | 55.4 | 81.8 | 12.9 |
| 540 | 2006Q3 | | | | | |
| | WRSI | 99,310 | 0.6 | 58.0 | 83.8 | 12.1 |
| | Adjusted WRSI | 99,310 | 0.3 | 58.3 | 83.9 | 12.1 |
| 550 | 2006Q2 | | | | | |
| | WRSI | 84,571 | 0.5 | 57.8 | 83.9 | 12.2 |
| | Adjusted WRSI | 84,571 | 0.3 | 58.2 | 84.0 | 12.1 |
| 560 | 2006Q1 | | | | | |
| | WRSI | 53,407 | 2.0 | 55.7 | 81.5 | 13.0 |
| | Adjusted WRSI | 53,407 | 0.4 | 56.9 | 82.5 | 12.5 |
| 570 | 2005Q4 | | | | | |
| | WRSI | 74,195 | 1.2 | 57.2 | 83.1 | 12.4 |
| | Adjusted WRSI | 74,195 | 0.5 | 57.7 | 83.5 | 12.3 |

FIG. 5

SYSTEM AND METHOD FOR PROVIDING AN ADJUSTED WEIGHTED REPEAT SALE INDEX

TECHNICAL FIELD

The present disclosure generally relates to estimating property values, and more particularly, to providing property value estimates based on a repeat sales model.

BACKGROUND

Financial institutions and businesses involved with sales of property have long tried to estimate values of property accurately. Accurate estimation serves many important purposes. For example, financial institutions use property value estimates as one of the key factors in calculating the loan to value (LTV) ratio of a home. The LTV ratio is the ratio of a first mortgage to the appraised value of the real property. The LTV ratio is an important calculation used by financial institutions to assess lending risks. For example, as the LTV ratio of a property increases, the likelihood of loan default increases. In addition, when a default does occur, the higher the LTV ratio, the greater the potential financial loss to the financial institution. Moreover, financial institutions may use the LTV ratio to mark-to-market their portfolio of outstanding loans. Mark-to-market is an accounting methodology used to calculate current LTV ratio of outstanding loans. Accordingly, the accuracy of the estimated value of real estate needed to calculate the LTV ratio is critical.

One technique for attempting to obtain an accurate estimated value of real estate utilizes a repeat sales index. A repeat sales index may be used to identify housing market conditions and the amount of equity homeowners have gained through house price appreciation. The index itself is a composite of changes for individual house prices within a geographical region, such as a municipality, zip code, county, region, or state. The data used in the repeat sales index may comprise successive selling prices and the sale dates for the same property (e.g., residential house). In essence, this approach finds the average rate of property appreciation in each period that gives the best statistical fit to all the overlapping holding periods. By using pricing of the same property, the repeat sales index eliminates the bias in price changes that are not due to the true house price change, but due to external factors such as, for example, consumer trends for bigger houses.

The basic repeat sales index may be improved through the use of data from refinance transactions, in addition to data from purchase transactions, in forming repeat sales forecasts, thereby increasing the size of the estimation sample and the timeliness of the evaluation sample. Moreover, as disclosed in U.S. Pat. No. 6,401,070, the data used in a repeat sales index may be weighted to provide particular importance to one set of data over another. The content of U.S. Pat. No. 6,401,070 is incorporated herein by reference.

There are qualitative differences between house price data derived from purchase transactions and from refinance transactions. Purchase transactions typically involve arms-length agreements in which the incentives of the parties will tend to result in an unbiased sales price, and the information of the three parties (buyer, seller, and appraiser) will tend to result in greater accuracy in ascertaining the value of the property. Refinance transactions, on the other hand, have valuation based solely on an appraisal and consequently are subject to several sources of bias. For example, incentive biases in appraisals arise because appraisers are motivated to arrive at valuations that can make the refinance transaction successful. Selection biases arise because, particularly in a down market, the properties that are eligible for refinance are more likely to be those that have appreciated relative to the market as a whole. Accordingly, a repeated sales index that factors in biases to the data is referred to as a weighted repeat sales index (WRSI). Here WRSI is used generically. WRSI also refers to indexes that include refinance transactions as well as property sale transactions, and indexes with and without weights on the transactions. As disclosed in U.S. Pat. No. 6,401,070, the WRSI may be expressed as:

$$\log(P_s/P_t) = I_s - I_t + d_{s2}R_{s2} - d_{t1}R_{t1} + \xi$$

The variable $P_t$ is the first transaction price, $P_s$ is the second transaction price, $I_t$ is the log index value at time t, $R_{t1}$ is equal to one (1) if the first transaction is a refinance and equal to zero (0) otherwise, $R_{s2}$ is equal to one (1) if the second transaction is a refinance and equal to zero (0) otherwise, $d_{t1}$ is a coefficient representing the first transaction refinance bias at time t, $d_{s2}$ is coefficient representing the second transaction refinance bias at time s, and $\xi$ is the error term. In essence, the refinance bias terms measure the difference in appreciation between purchase and refinance transactions at the two dates. The $d_{t1}$ coefficients may be thought of as measuring the incentive bias and the $d_{s2}$ coefficients as measuring the combined selection and incentive bias. Accordingly the WRSI model of equation (1) allows for time varying differences between refinance and purchase transactions, thereby improving forecast accuracy.

As used herein, "aggregated level" refers to a geographic region comprised of smaller geographic regions. For example, a state may be an aggregated level of counties. As used herein, "disaggregated level" refers to a geographic region that may be included in an aggregated level. For example, a county may be a disaggregated level of a state.

Using the WRSI model, trends and growth changes in house prices may be evident from examining plots of quarterly WRSI growth at aggregated levels, such as a state level and region level (e.g., one of the geographic regions within the United States of America officially recognized by the United States Census Bureau). However, trends and growth changes in house prices are generally not evident when examining quarterly plots of WRSI growth at disaggregated levels, such as at a county level, a zip code level, or a census tract. This disparity is caused primarily by the occurrence of relative fewer transactions (i.e., purchases, refinances) at a disaggregated level when compared to an aggregated level. Accordingly, when examining WRSI at a disaggregated level, a proper analysis of market conditions and trends is not possible over relatively short periods of time. For example, in a volatile housing market, housing prices in a large geographic region, such as the state of California, may fall in one quarter by 10%. However, examining the WRSI within a zip code in California over the same quarterly or monthly period may not demonstrate a fall of 10%. This is due to the relative lower number of transactions at the zip code level. In fact, there may be very few, or even no transactions in the zip code in the quarter or month.

Accordingly, the inventors have determined that WRSI may lag in providing property growth rate estimates at disaggregated geographic levels, and may not exhibit seasonal differences in property values. Systems and methods consistent with the present invention address the difficulties discussed above by providing an adjusted WRSI that calculates a more accurate estimated value of real estate growth rates at disaggregated levels, among other things.

SUMMARY

Consistent with the present invention, as embodied and broadly described herein, systems and methods are disclosed for providing an adjusted weighted repeat sales index.

In one exemplary embodiment, a method for adjusting a weighted repeat sales index is disclosed. The method comprises calculating data for estimating the adjustments from aggregated levels to disaggregated levels by marking a first transaction to a second transaction using a repeat sales house price index function at an aggregated level; determining, using the calculated data, an estimate of the deviation between the repeat sales house price index at the aggregated level and a repeat sales house price index at a disaggregated level; and calculating the repeat sales house price index at the disaggregated level based on the determined estimate of the deviation from the aggregated level.

In another embodiment, a system for adjusting a weighted repeat sales index is disclosed. The system comprises means for calculating data for estimating the adjustments from aggregated levels to disaggregated levels by marking a first transaction to a second transaction using a repeat sales house price index function at an aggregated level; means for determining, using the calculated data, an estimate of the deviation between the repeat sales house price index at the aggregated level and a repeat sales house price index at a disaggregated level; and means for calculating the repeat sales house price index at the disaggregated level based on the determined estimate of the deviation from the aggregated-level index.

In yet another embodiment, a computer-readable medium including program instructions for performing, when executed by a processor, a method for adjusting a weighted repeat sales index. The method comprises calculating data for estimating the adjustments from aggregated levels to disaggregated levels by marking a first transaction to a second transaction using a repeat sales house price index function at an aggregated level; determining, using the calculated data, an estimate of the deviation between the repeat sales house price index at the aggregated level and a repeat sales house price index at a disaggregated level; and calculating the repeat sales house price index at the disaggregated level based on the determined estimate of the deviation from the aggregated-level index.

It is to be understood that both the foregoing general description and the following detailed description are exemplary and explanatory only and are not restrictive of the invention, as described. Further features and/or variations may be provided in addition to those set forth herein. For example, embodiments of the present invention may be directed to various combinations and subcombinations of several further features disclosed below in the detailed description.

BRIEF DESCRIPTION OF THE DRAWINGS

The accompanying drawings, which are incorporated in and constitute a part of this specification, illustrate various features, embodiments and aspects consistent with the invention and, together with the description, explain advantages and principles of the invention. In the drawings.

FIG. 5 is an exemplary table of measured performance statistics for adjusted WRSI and WRSI, consistent with the principles of the present invention.

DESCRIPTION OF THE EMBODIMENTS

Reference will now be made in detail to various embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Systems and methods consistent with principles of the present invention address the limitations and disadvantages of traditional WRSI for forecasting house price values. Systems and methods consistent with principles of the present invention estimate real estate property values based on an adjusted repeat sales model.

Figure 1:
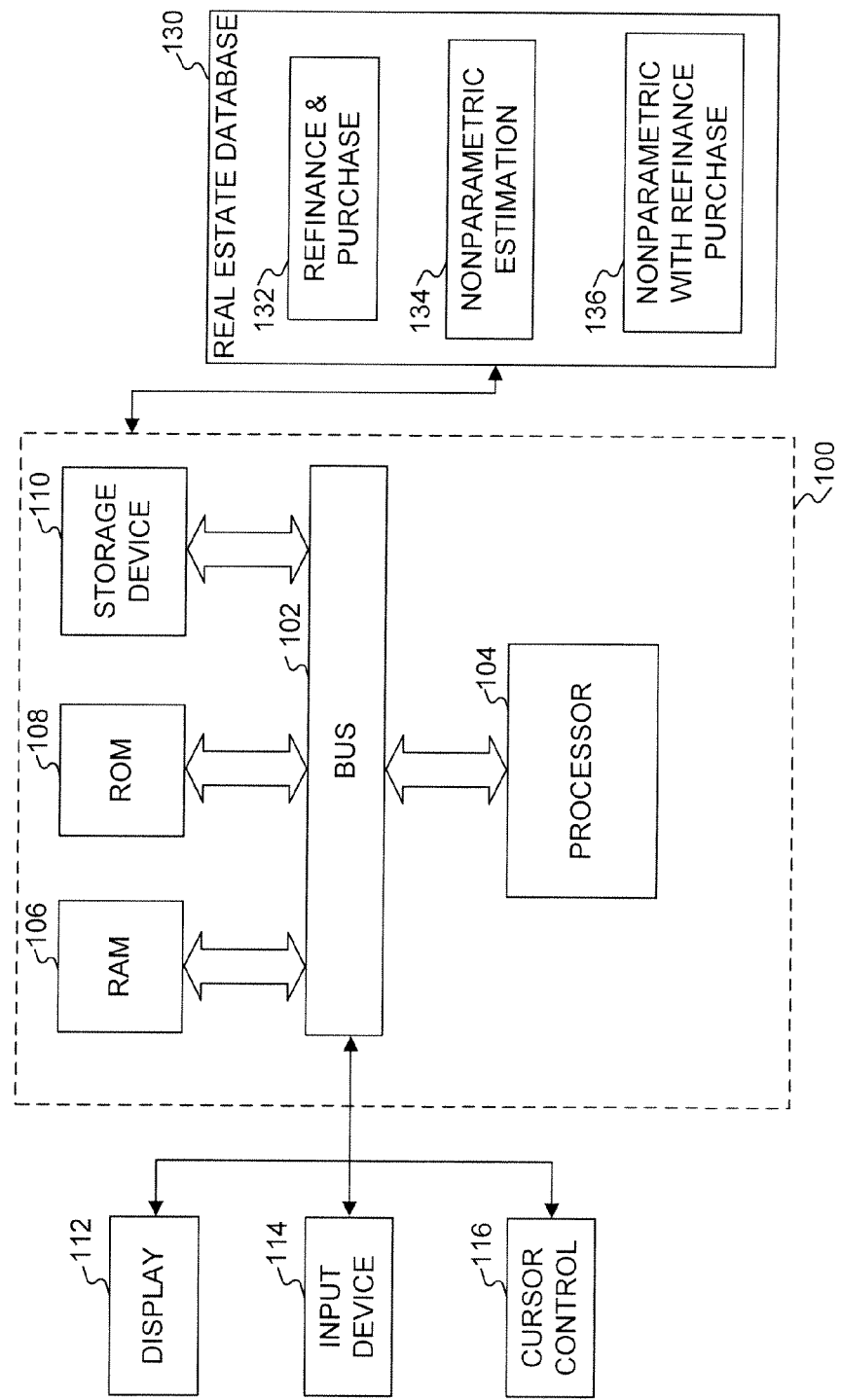
FIG. 1 is a block diagram of an exemplary overview of a property value estimation system, consistent with the principles of the present invention.

FIG. 1 is a block diagram illustrating an exemplary system architecture for a computer system with which embodiments consistent with the present invention may be implemented. In the embodiment shown, computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used to store temporary variables or other intermediate information produced during execution of instructions by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a thin film transistor liquid crystal display (TFT-LCD), for displaying information to a computer user. An input device 114, such as a keyboard including alphanumeric and other keys, is coupled to bus 102 for communicating information and command selections to processor 104. Another type of user input device is a cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

In the embodiment show, computer system 100 accesses data from real estate database 130 and executes one or more sequences of one or more instructions contained in main memory 106. Both the data from real estate database 130 and the instructions may be read into main memory 106 from another computer-readable medium, such as storage device 110. Data from real estate database 130 may comprise refinance and purchase transaction data 132, nonparametric estimation data 134, and nonparametric with refinance and purchase transaction data 136. The instructions may implement adjusted WRSI models, as discussed in greater detail below. Execution of the sequences of instructions contained in main memory 106 causes processor 104 to perform operations consistent with the process steps described herein. In one alternative implementation, hardwired circuitry may be used in place of or in combination with real estate database and/or software instructions to implement the invention. Thus implementations of the invention are not limited to any specific combination of hardware circuitry and software.

Computer system 100 may communicate with real estate database 130 through a communication channel comprising, for example, alone or in any suitable combination, a telephony-based network, a local area network (LAN), a wide area network (WAN), a dedicated intranet, wireless LAN, the Internet, and intranet, a wireless network, a bus, or other appropriate communication mechanisms. Moreover, various combinations of wired and/or wireless components may be incorporated into the communication channel. Furthermore, various combinations of point-to-point or network communications may also be incorporated into the communication channel to facilitate communication between the computer system 100 and the real estate database 130. Additionally, data communicated through the communication channel may be communicated instead through the transfer of computer-readable media, such as DVDs.

The term "computer-readable medium" as used herein refers to any media that participates in providing instructions to processor 104 for execution. Such a medium may take many forms, including but not limited to, non-volatile media and volatile media. Non-volatile media includes, for example, optical or magnetic disks, such as storage device 110. Volatile media includes dynamic memory, such as main memory 106.

Figure 2A:
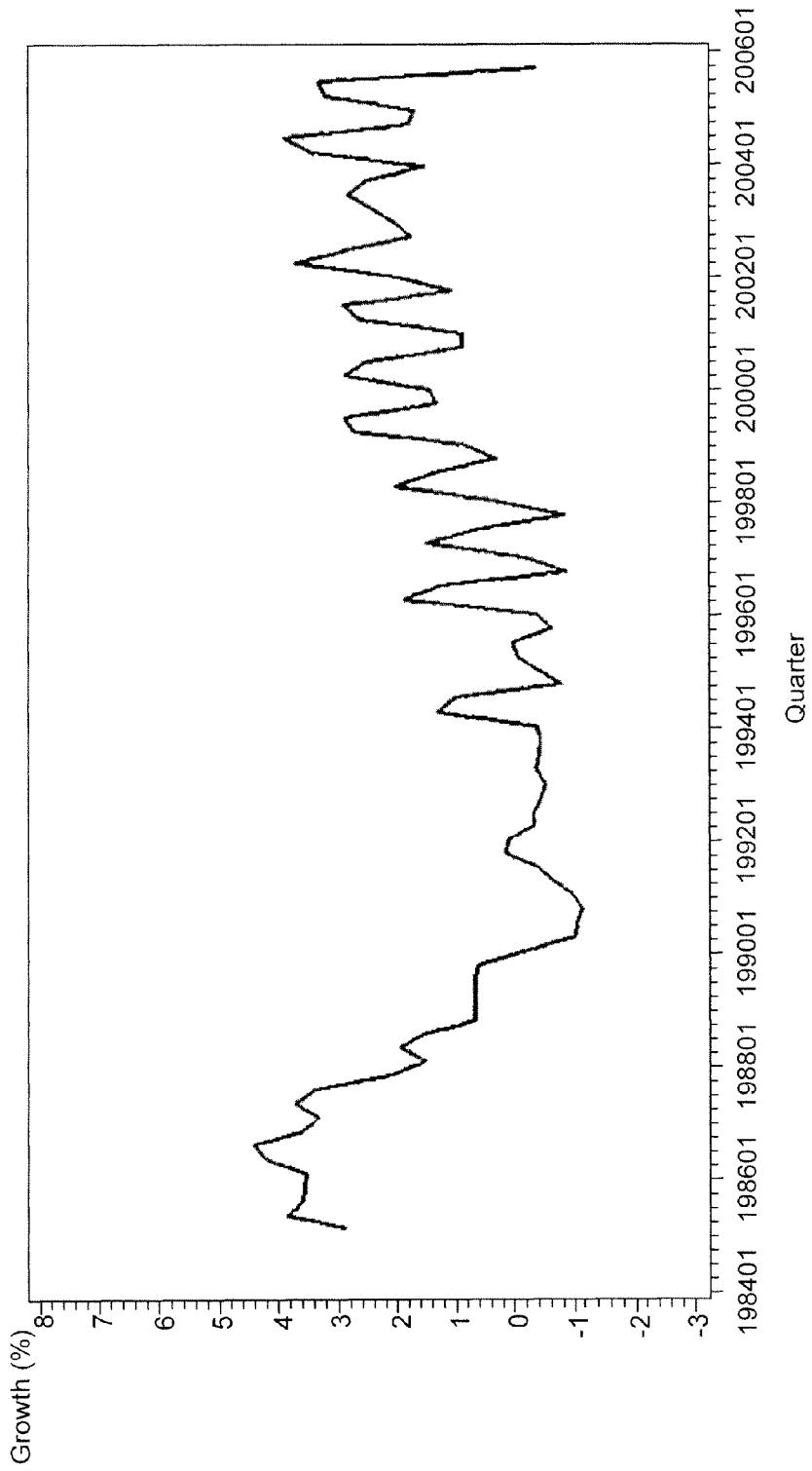
FIGS. 2A and 2B illustrate examples of plots of the WRSI quarterly house price growth at aggregated levels, consistent with the principles of the present invention.
Figure 2B:
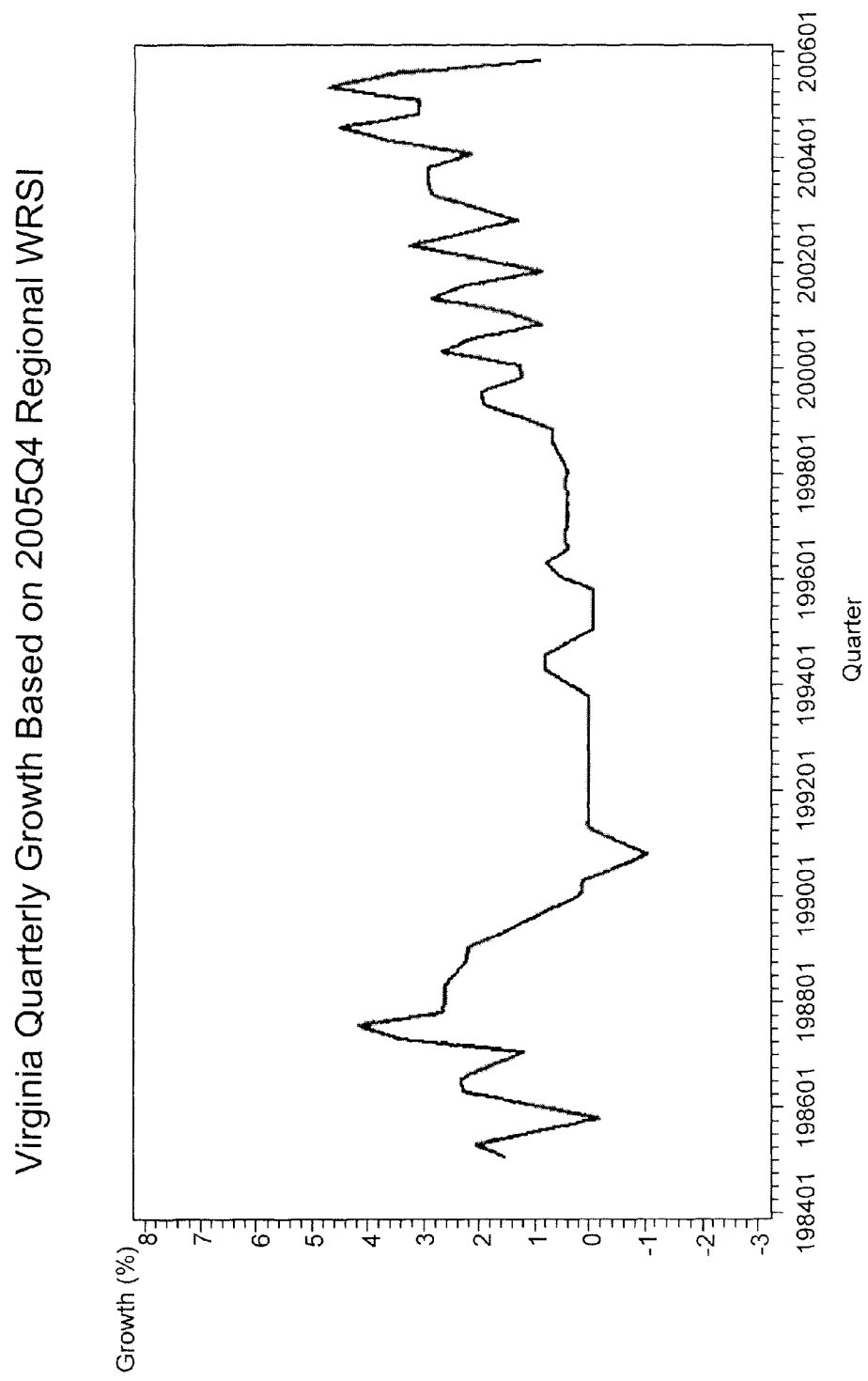

FIGS. 2A and 2B illustrate examples of plots of WRSI quarterly house price growth at aggregated levels using equation (1) disclosed above. Specifically, FIG. 2A illustrates a WRSI growth plot of the Northeast region of the United States and FIG. 2B illustrates a plot of the state of Virginia from the first quarter of 1984 through the first quarter of 2006.

Figure 3A:
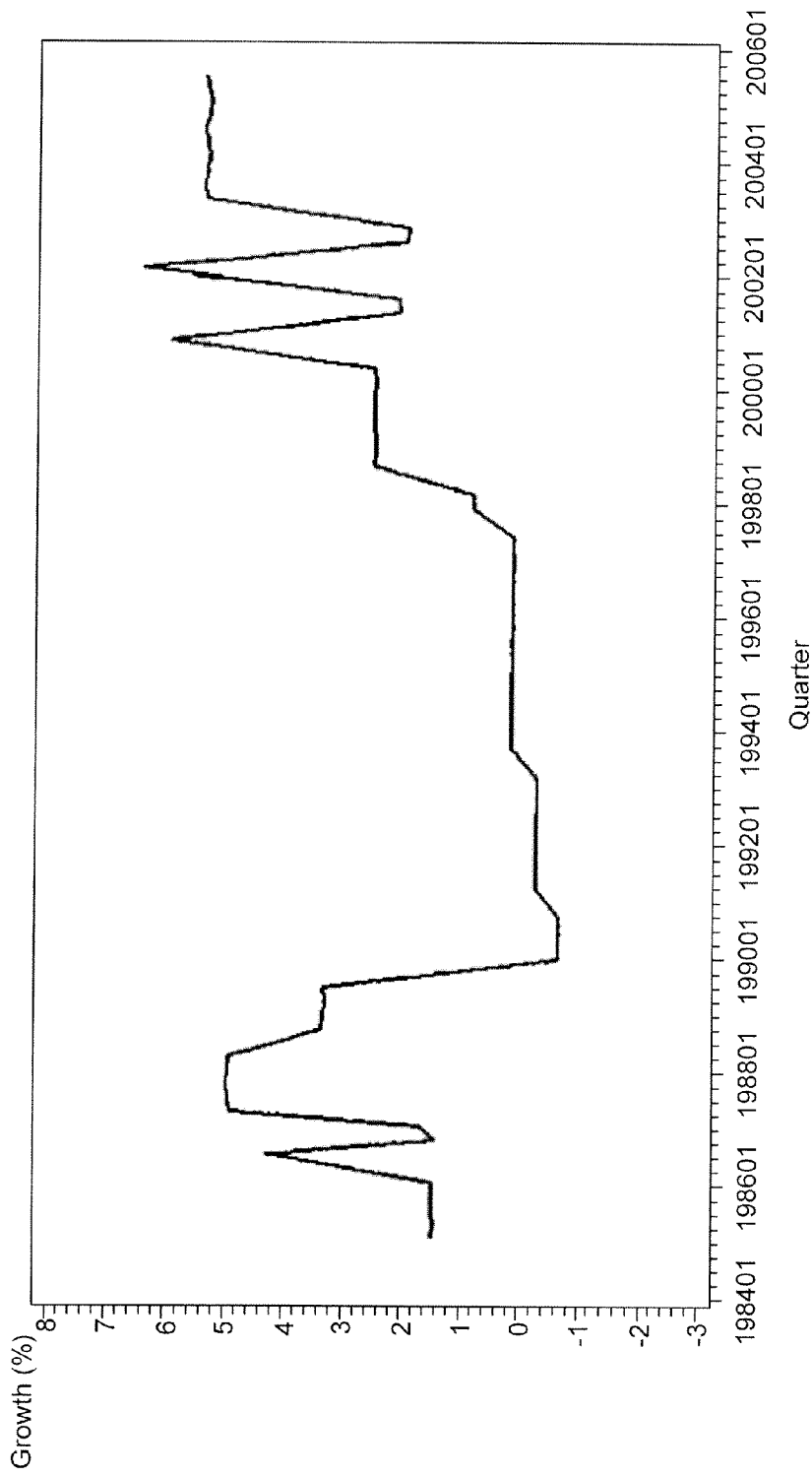
FIGS. 3A and 3B illustrate examples of plots of the WRSI quarterly house price growth at disaggregated levels, consistent with the principles of the present invention.
Figure 3B:
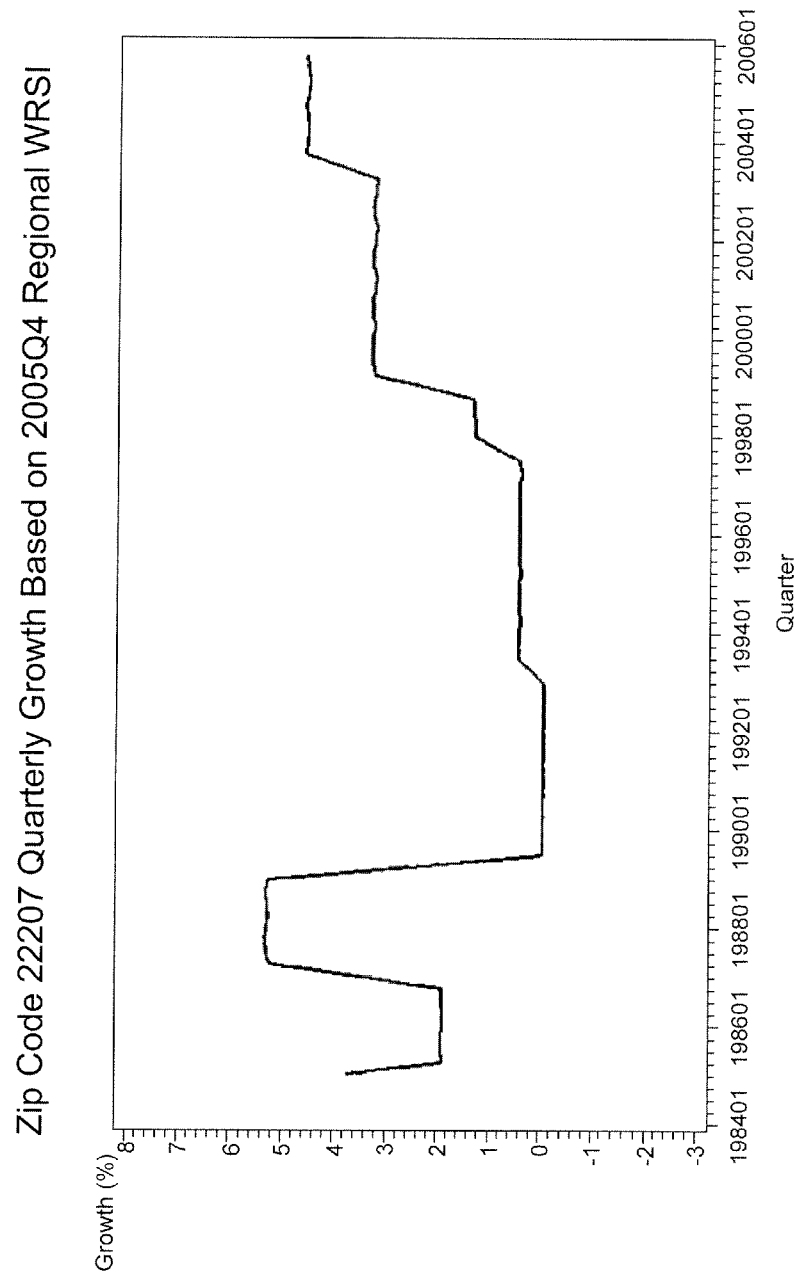

FIGS. 3A and 3B illustrate examples of plots, over the same time period as FIGS. 2A and 2B, of WRSI quarterly house price growth at disaggregated levels using equation (1). Specifically, FIG. 3A illustrates a WRSI growth plot of Arlington County in the state of Virginia and FIG. 3B illustrates a WRSI growth plot for the zip code 22207 located within Arlington County. When comparing the plots of FIGS. 2A and 2B with the plots of FIGS. 3A and 3B, it is evident that patterns (e.g., the seasonality of home prices) and trends (e.g., a decline in the overall housing market) in housing prices are more readily detected at aggregated levels than at disaggregated levels. A primary factor in the differences in the plots of FIGS. 2A and 2B in comparison with FIGS. 3A and 3B is that fewer quarterly knot points are selected (i.e., fewer changes in growth rates are included) and used in the WRSI model at disaggregated levels since there are fewer observations (i.e., purchases and refinances) available for estimation.

In one embodiment consistent with the invention, to improve WRSI plots at disaggregated levels, information from the more aggregated levels may be incorporated into the WRSI model in order to provide an estimate of the disaggregated levels as deviations from the aggregated levels. This improved WRSI model is referred to herein as the "adjusted WRSI model" or "adjusted WRSI."

Figure 4:
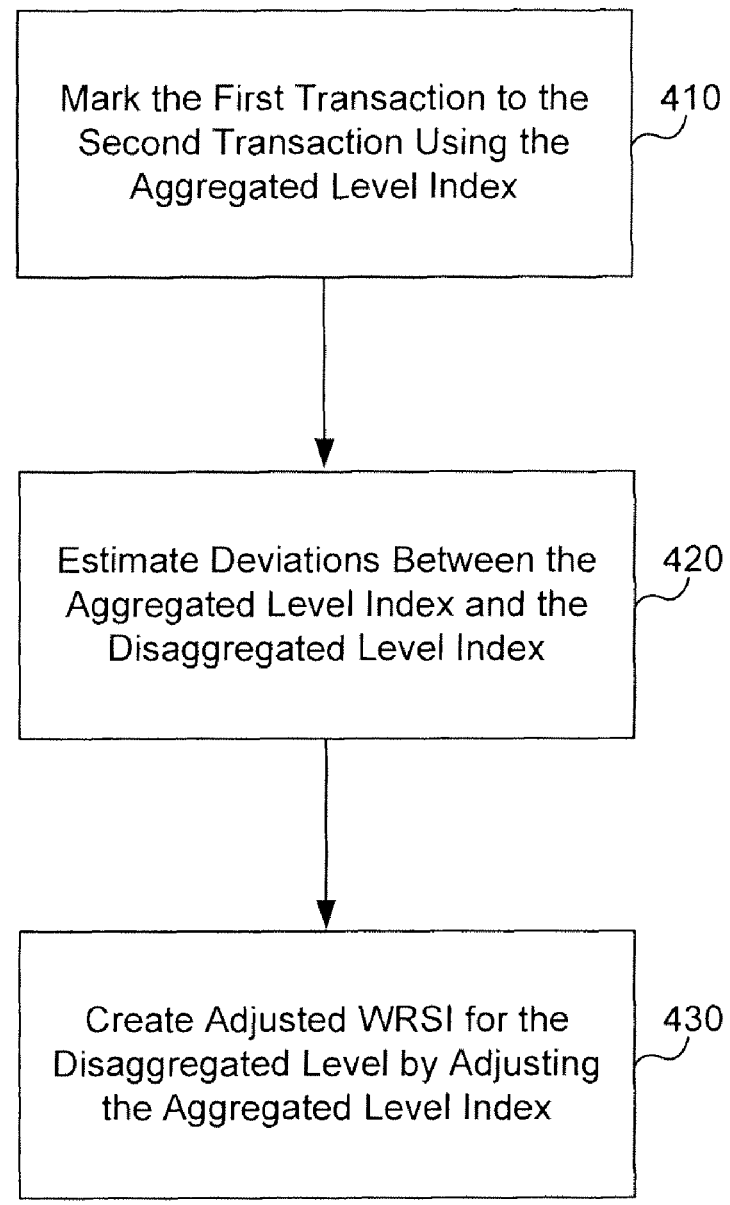
FIG. 4 is an exemplary flowchart for an adjusted WRSI methodology, consistent with the principles of the present invention.

FIG. 4 is an exemplary flowchart of the steps used to implement an embodiment of the adjusted WRSI model. In step 410, data for estimating the adjustments from aggregated to disaggregated levels are created by marking (e.g., pairing) a first real estate transaction to a second real estate transaction using a repeat sales house price index function at an aggregated level, designated by I(t). For discussion of this embodiment, the aggregated level will be the state level. I(t) for the state level may be calculated using equation (1) discussed above. Specifically, in one embodiment, I(t) may be calculated using equation (1) in conjunction with either standard regression techniques and refinance and purchase data 132 or nonparametric estimation techniques with nonparametric estimation data 134 or nonparametric with refinance and purchase data 136. Nonparametric estimation techniques improve over standard regression techniques by removing temporal aggregation bias, which results from treating house price inflation as a constant within a time interval. In addition, nonparametric estimation techniques take as fixed the tradeoff between the variability of the estimates and the bias in the fineness of time intervals used. For example, it may be better to use wider intervals over time periods with relatively few observations and conversely, tighter intervals over time periods with a large number of observations. In an embodiment using a linear spline nonparametric estimator, I(t) may be approximated as shown in equation (2):

$$I(t)=a+b_0t+b_1\max[0,t-kj_1]+b_2\max[0,t-k_2]\ldots b_n\max[0,t-k_n] \quad (2)$$

with knot points at $(k_1,\ldots,k_n)$ and coefficients $(a, b_0,\ldots, b_n)$. An implementation of a nonparametric functional estimator may be referred to as a linear regression spline, which estimates the unknown index function I(t). As the number of knots increases $(n\to\infty)$ and $\{k_i\}_{i=1}^n$ becomes dense in the domain of the function, the approximating class of $I_s$ has the property that over compact domains, $\min_b\|I_s(t)-I(t)\|\to 0$. And thus under suitable technical conditions, if the number of known knot points is allowed to increase with sample size, I(t) can be consistently estimated.

In step 420, the second step shown in FIG. 4, estimation of the deviation between the aggregated level index, in this example the state level index, and the disaggregated level index, is determined. For purposes of this example, the disaggregated level index is the county level. The deviations may be determined using time spline variables. The time spline variables can be those described in U.S. Pat. No. 6,401,070 "System and Method for Providing House Price Forecasts based on Repeat Sales Model." The marked transactions from step 410, along with the aggregate-level (state-level) index are the inputs to step 420. When the deviations are estimated in step 420, they are then passed to step 430.

In step 430, an adjusted WRSI for the disaggregated level is created by adjusting the aggregated level index, using the adjustments calculated in step 420. In this example, an adjusted WRSI for the county level is created by calculating the repeat sales house price index function I(t) for the state by the estimated deviations determined in step 420. The adjusted WRSI model may be expressed as:

$$\ln\left(\frac{P_{i(t+1)}}{\hat{P}_{i(t+1)}}\right) = \sum_{j=1}^{k} \beta_j [\max(0, \text{date}_{i(t+1)} - s_j) - \max(0, \text{date}_{it} - s_j)] + \quad (3)$$

$$\beta_{(k+1)}R_{it} + \beta_{(k+2)}R_{i(t+1)} + \sum_{j=1}^{k} \delta_j \max(0, \text{date}_{it} - s_j)R_{it} +$$

$$\sum_{j=1}^{k} \varphi_j \max(0, \text{date}_{i(t+1)} - s_j)R_{i(t+1)} + e_{it(t+1)}$$

The variable $P_{i(t+1)}$ is the transaction value (i.e., the purchase price or appraised value) of house i (i=1, ..., n) at time t+1 (t=1, ..., T), $\hat{P}_{i(t+1)}$ is the estimated transaction value (i.e., estimated purchase price or estimated appraisal value) of house i (i=1, ..., n) at time t+1 (t=1, ..., T), estimated as the value of house i at time t inflated/deflated to time t+1 according to the state level index, $\text{date}_{it}$ is the purchase or refinance date of house i (i=1, ..., n) at time t (t=1, ..., T), $R_{it}$ is the refinance flag (0=purchase, 1=refinance) for transaction of house i (i=1, ..., n) at time t (t=1, ..., T), $S_j$ is the knot point (specified as a date) for the $j^{th}$ spline variable (j=1, ..., k, where k is the number of quarters between 1975Q1 and current quarter), and βj, $β_{(k+1)}$, $β_{(k+2)}$ δj, φj are the model parameters (j=1, ..., k, where k is the number of quarters between a starting quarter, such as 1975Q1 and a current quarter).

The above adjusted WRSI model not only calculates an adjusted index of a disaggregated level using data from that disaggregated level, but also using data from an aggregated level that contains the disaggregated level. For example, the above model may calculate an index for a particular zip code using both data from that particular zip code level and data from the state in which the zip code is located. As a result, the adjusted WRSI model estimates the index of a disaggregated level as a deviation from an aggregated level.

In one embodiment, equation (3) may be simplified by eliminating refinance transactions and thereby using only purchase price data as transaction values. Such a simplification may be expressed as shown in equation (4):

$$\ln\left(\frac{P_{i(t+1)}}{\hat{P}_{i(t+1)}}\right) = \quad (4)$$

$$\sum_{j=1}^{k} \beta_j [\max(0, \text{date}_{i(t+1)} - s_j) - \max(0, \text{date}_{it} - s_j)] + e_{it(t+1)}$$

Again, maintaining the example where the aggregated level is a state level and the disaggregated level is a county level, the county level index is estimated as a deviation from the state level index. Thus, for any repeat sales observation of a specific property ($P_1$=earlier sale price, $P_2$=recent sale price) in the county level regression, the change in purchase price is expressed as a deviation of the property's price growth relative to the state index growth. The difference between the estimated purchase value and the actual purchase value (i.e., "residual") is given by $\log(P_2) - \log(P_1) - (I_2^{state} - I_1^{state})$. Using this residual as the dependent variable, the log index for the county may be determined by the sum of the state log index plus the estimated average deviations from the state index. This may be represented as $I^{county} = I^{state} + I^{county\ deviation\ from\ state}$.

FIG. 5 illustrates an exemplary comparison of measured performance statistics for WRSI and adjusted WRSI as disclosed herein. In the implementation illustrated, in the overall comparison between the fourth quarter of 2005 through the fourth quarter of 2006 (row 505), the use of WRSI in a mark-to-market value estimation process results in a median bias of 1.1% above actual sales price (cell 510, top number). On the other hand, using adjusted WRSI in a mark-to-market value estimation process results in a median bias of only 0.3% above actual sales price (cell 510, bottom number). As further illustrated in FIG. 5, using WRSI in the mark-to-market value estimation process results in 56.9% of value estimates falling within ±10% of the actual sales price, while the use of adjusted WRSI in the mark-to-market value estimation process produces an improved result of 57.5% of value estimates falling within ±10% of the actual sales price (cell 515). WRSI also produces a result of 82.9% of value estimates falling within ±20% of the actual sales price, while adjusted WRSI produces an improved result of 83.3% of value estimates falling within ±20% of the actual sales price (cell 520). A calculation of the Robust Root Means Squared Error (RMSE), which includes the bias plus the standard deviation, illustrates that adjusted WRSI produces a lower robust RMSE of 12.3% when compared to 12.5% of WRSI (cell 525). FIG. 5 also illustrates measurements of performance statistics of adjusted WRSI and WRSI for specific quarters (rows 530-570).

Figure 6A:
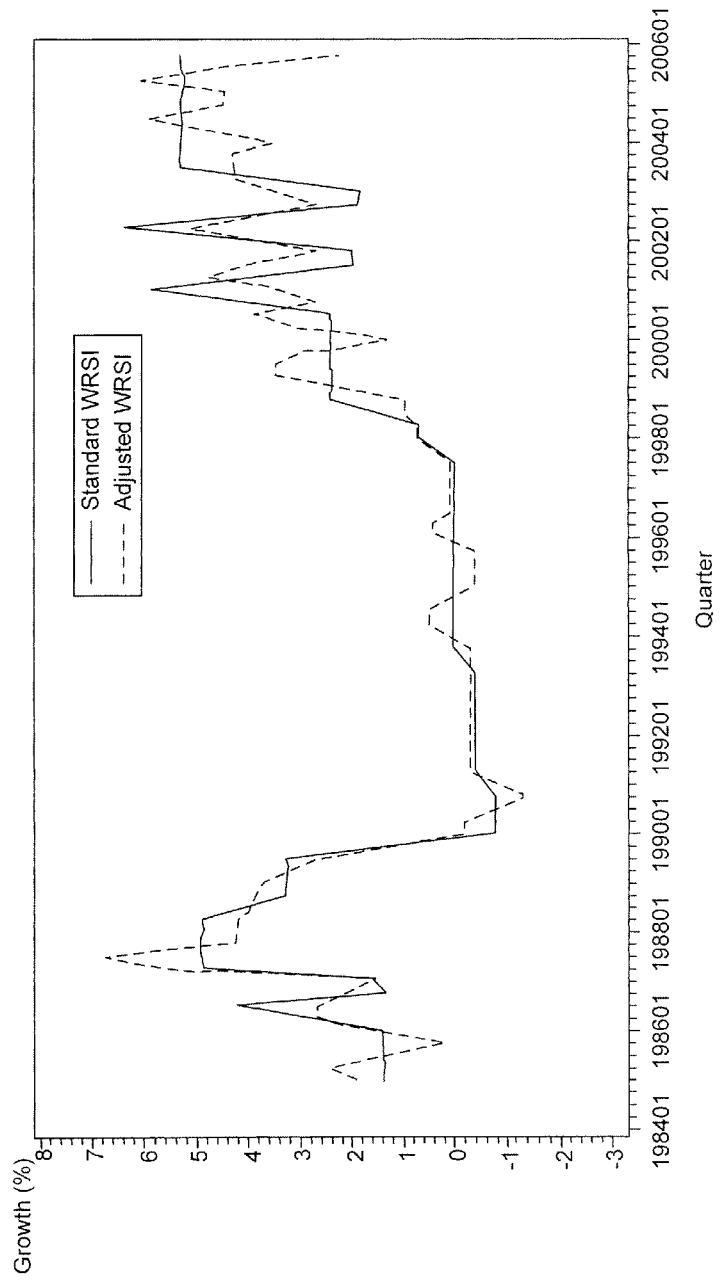
FIGS. 6A and 6B illustrate examples of plots of adjusted WRSI and WRSI quarterly house price growth at two examples of disaggregated levels.
Figure 6B:
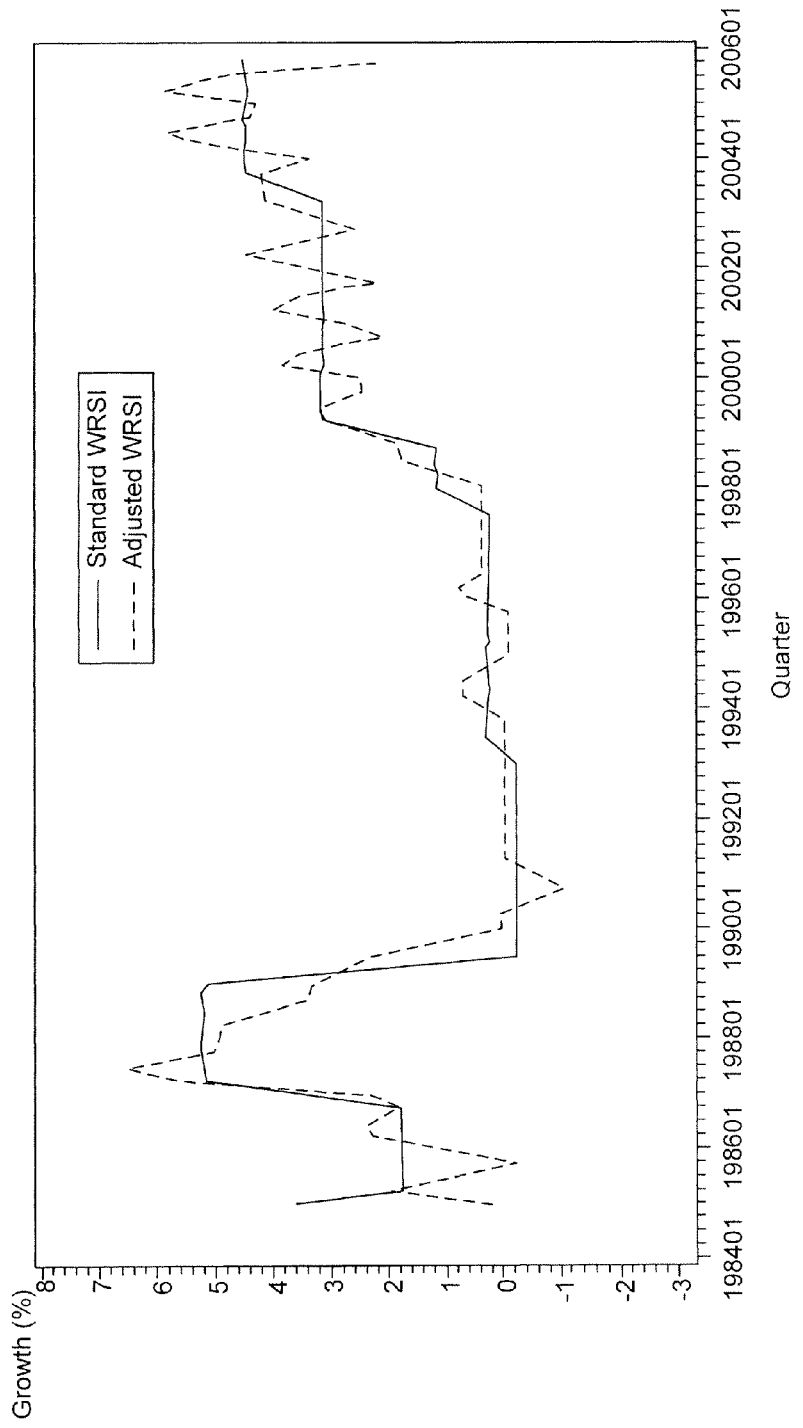

FIG. 6A illustrates exemplary plots of adjusted WRSI and WRSI at a disaggregated level, in this example, for Arlington county. FIG. 6B illustrates exemplary plots of adjusted WRSI and WRSI index growth rates at another disaggregated level, in this example, for zip code 22207. As shown in these figures, adjusted WRSI produces an improved indication of changes in home price values when compared with WRSI. For example, in FIG. 6B, the seasonal trends from 1999 through 2002 are clearly shown in the adjusted WRSI plot, but the standard WRSI plot for the same period is essentially flat, indicating no seasonal changes.

The foregoing description of possible implementations and embodiments consistent with the present invention does not represent a comprehensive catalog of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A computer-implemented method for adjusting a weighted repeat sales index using at least one processor, the method comprising:

calculating, by the at least one processor, data for estimating adjustments from aggregated levels to disaggregated levels by marking a data element representing a first transaction to a data element representing a second transaction using a processor-implemented repeat sales house price index function at an aggregated level;

determining, by the at least one processor using the calculated data, an estimate of deviation between the repeat sales house price index at the aggregated level and a repeat sales house price index at a disaggregated level; and calculating, by the at least one processor, the repeat sales house price index at the disaggregated level based on the determined estimate of the deviation from the aggregated level, wherein the adjusted weighted repeat sales index produces an estimated index function.

2. The computer-implemented method of claim 1, wherein the deviations are estimated as a function of time spline variables.

3. The computer-implemented method of claim 2, wherein an increase of a number of knot points of the time spline increases the accuracy of the estimated index function.

4. The computer-implemented method of claim 1, wherein the aggregated level is one of the geographic regions within the United States of America or a state.

5. The computer-implemented method of claim 1, wherein the disaggregated level is a county, a zip code area, or a census tract.

6. A system for adjusting a weighted repeat sales index, the system comprising:
  means for calculating data for estimating adjustments from aggregated levels to disaggregated levels by marking a data element representing a first transaction to a data element representing a second transaction using a processor-implemented repeat sales house price index function at an aggregated level;
  means for determining, using the calculated data, an estimate of deviation between the repeat sales house price index at the aggregated level and a repeat sales house price index at a disaggregated level; and
  means for calculating the repeat sales house price index at the disaggregated level based on the determined estimate of the deviation from the aggregated level, wherein the adjusted weighted repeat sales index produces an estimated index function.

7. The system of claim 6, wherein the deviations are estimated as a function of time spline variables.

8. The system of claim 7, wherein an increase of a number of knot points of the time spline increases the accuracy of the estimated index function.

9. The system of claim 6, wherein the aggregated level is one of the geographic regions within the United States of America or a state.

10. The system of claim 6, wherein the disaggregated level is a county, a zip code area, or a census tract.

11. A non-transitory computer-readable medium storing program instructions for performing, when executed by a processor, a method for adjusting a weighted repeat sales index, the method comprising:
  calculating data for estimating adjustments from aggregated levels to disaggregated levels by marking a data element representing a first transaction to a data element representing a second transaction using a processor-implemented repeat sales house price index function at an aggregated level;
  determining, using the calculated data, an estimate of deviation between the repeat sales house price index at the aggregated level and a repeat sales house price index at a disaggregated level; and
  calculating the repeat sales house price index at the disaggregated level based on the determined estimate of the deviation from the aggregated level, wherein the adjusted weighted repeat sales index produces an estimated index function.

12. The computer-readable medium of claim 11, wherein the deviations are estimated as a function of time spline variables.

13. The computer-readable medium of claim 12, wherein an increase of a number of knot points of the time spline increases the accuracy of the estimated index function.

14. The computer-readable medium of claim 11, wherein the aggregated level is one of the geographic regions within the United States of America or a state.

15. The computer-readable medium of claim 11, wherein the disaggregated level is a county, a zip code area, or a census tract.

* * * * *